UNITED STATES PATENT OFFICE.

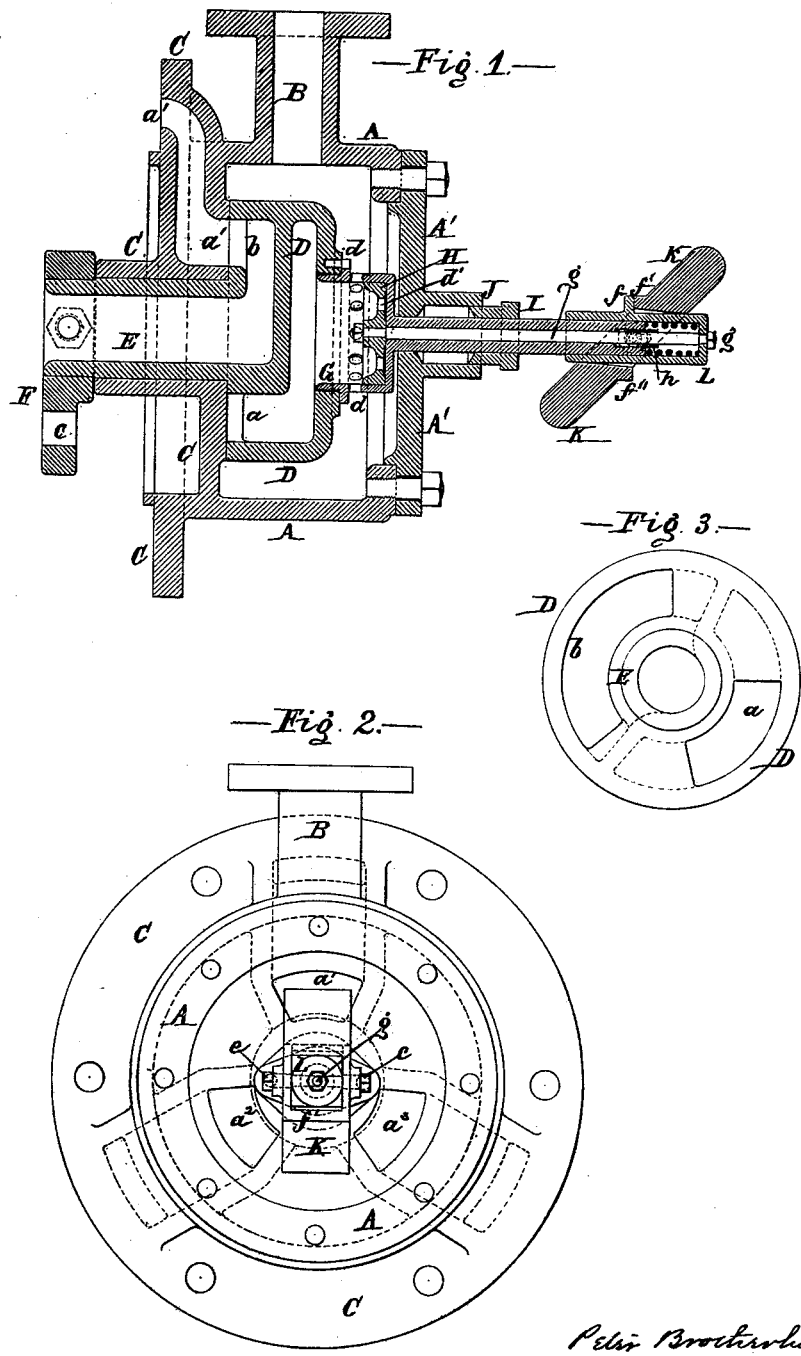

PETER BROTHERHOOD, OF NOTTING HILL, ENGLAND.

IMPROVEMENT IN GOVERNORS FOR STEAM-ENGINES.

Specification forming part of Letters Patent No. 185,891, dated January 2, 1877; application filed June 23, 1875.

*To all whom it may concern:*

Be it known that I, PETER BROTHERHOOD, of No. 25 Ladbroke Gardens, Notting Hill, in the county of Middlesex, England, have invented certain new and useful Improvements in Governors for Steam-Engines, of which improvements the following is a specification:

The governor most generally employed for controlling the revolutions of a steam-engine is technically termed a ball-governor, and comprises a stem to which balls or weights are jointed by means of suitable arms to form a centrifugal device, so that varying revolutions of the stem will cause the plane of revolution of the balls to approach toward or recede from the point of suspension on the stem, and by means of suitable connections, a proportioned amount of this movement is communicated to a valve which controls the admission of steam to the engine. In this form of governor, gravity gives the balls a tendency toward the stem, and the rapidity of their revolution a tendency from it. A modification of this form consists in giving the balls a tendency toward the stem by means of a spring or weight, and counteracting this tendency by a greatly-increased velocity, so that by modifying the weight or the tension of the spring, the velocity of the balls must be changed, to maintain them in the same position, or if the velocity is maintained the position will be changed. The position of the balls with reference to their point of suspension is also greatly varied. In many cases two balls or weights are employed upon opposite sides of the point of suspension revolving in parallel planes, one ball balancing the other, the balls, and their connection to the point of suspension, forming a rigid bar vibrating about the point of suspension. In others four balls are used, two on each side of the point of suspension, the four balancing each other. In both a spring is required to give the balls a tendency toward the stem, the rapidity of their revolution furnishing the opposite tendency; and in both, if the velocity is uniform, modifying the tension of the spring, will produce a change in the position of the balls.

In the ball-governors first described the plane of revolution will be stationary until the speed is changed, and if the regulating-valve is connected to the balls, so that its movement is proportionate to the movement of the balls, an increased load upon the engine must result in a diminution of speed, and a diminution of the load must result in an increase of speed, so that uniformity of speed with a varying load cannot be attained. The same result will take place with any of the other forms of ball-governors referred to, but in these the proper speed may be recovered by modifying the action of the weight, or the tension of the spring which moves the balls in one direction.

My invention relates to that class of governors in which the velocity being uniform, the position of the balls will be changed by modifying the action of the weight or the tension of the spring which moves them in one direction, and my object is to attain with such governors a uniform speed with a varying load.

The nature of my invention consists in modifying automatically the action of the weight, or the tension of the spring which moves the balls in one direction. The means by which this is accomplished will be fully understood from the following description, reference being had to the accompanying drawings, forming part of this specification, in which I have shown an exemplification of my improvement as applied to my triple-cylinder engine described in the Letters Patent of the United States issued to me December 23, 1873, with an improved rotary valve described in Letters Patent of the United States granted to me, of even date herewith.

Figure 1 is a section through the axis of the valve, its chest or cover, and the governor. Fig. 2 is a plan of the governor and the valve-chest, with the cover of chest and the valve removed to show the ports. Fig. 3 is a plan of the valve, showing its steam and exhaust openings.

A A represent the valve-chest or cover, which is provided with a nozzle, B, for the admission of steam. One end of this cover is closed by a cap, A' A', bolted to a flange in the cover, and the other end by a head, C C, cast with the cover. In this head are provided steam-passages $a^1$ $a^2$ $a^3$, which, at one end, open into the interior of the chest, and at the other into the passages leading to the cylinder. An extension of this head forms a flange, through which the chest is bolted to the central chamber of my triple-cylinder engine.

The rotary valve D is cylindrical in form, and its interior is divided into two parts or passages—a for steam, b for exhaust—and openings through the face of the valve to these passages serve to place them alternately in communication with the cylinder-passages described in my before-mentioned former patent.

Perpendicular to the face of the valve, and cast with it, a cylindrical hub, E, projects through the head C C, which it fits accurately. The hole through the hub communicates with the exhaust-passage b, and must be of sufficient size to transmit the exhaust freely from the valve into the central chamber, before mentioned. Upon the end of the hub E I secure a crank, F, having a hole, c, which fits loosely over a projection from the crank-pin, by means of which motion is communicated to the valve. The steam-passage a, at its outer end, is closed by a cylindrical brass cover, G, through which steam is admitted from the chest A A by a series of holes, d d d, in the same plane. The interior of the cover G is provided with a disk, H, which slides freely within it, so as to cover, partially or entirely, the holes d d d, and regulate the quantity of steam which can pass through the valve. One or more holes, d', are bored through this disk parallel to its axis, to prevent the pressure of steam from operating upon it in this direction.

Upon the exterior of the cover G, and in line with the axis of the valve D, I provide a hollow shaft, I, which passes through the stuffing-box J in the valve-chest cap A' A', and upon its outer extremity the vibrating bar K is suspended by screws e e, which pass through the sides of the bar and take into holes provided for that purpose in the shaft I. Upon the outer end of the shaft I I provide a cylindrical slide, L, closed at one end, and fitted to slide freely upon the shaft. Upon one side it has a projection, f, to receive a corresponding projection, f', upon the vibrating bar K; and to balance this weight a corresponding projection, f'', is made upon the opposite side of the bar.

To the closed end of the slide L I attach the disk H by means of the rod g g, which passes through and fits easily in the hollow shaft I, and, to prevent the escape of steam around this rod, the stuffing-box h h in the outer end of the shaft I is provided. Between the closed end of the slide L and the outer end of the shaft I a spiral spring is inserted, which is compressed as the slide is pushed onto the shaft, and, by its action through the projections f and f', tends to maintain the bar K in the position shown by the drawing.

The revolution of the shaft 1 and bar K will create a tendency in the bar to assume a position more nearly at right angles to the shaft, which tendency will be resisted by the spring and the pressure of the steam against the inner end of the rod g g; but when the revolutions have become sufficiently rapid to overcome this resistance, the rod will be moved, carrying with it the disk H, partially covering the holes d d d and reducing the flow of steam into the valve, thereby reducing the pressure upon the piston and checking a further increase of speed, while a diminution of speed will, through the operation of the forces and means described, increase the opening for the admission of steam into the valve and prevent a further reduction, thus controlling the revolutions of the engine-shaft within limits proportioned to the degree of motion required by the disk to admit the largest or smallest quantity of steam demanded by the engine to perform the work.

As previously stated, the revolution of the shaft I and bar K will create a tendency in the bar to assume a position more nearly at right angles to the shaft, which tendency will be resisted by the spring and the pressure of the steam against the inner end of the connecting-rod g g, but, as this rod passes into the space within the valve in which the tension of the steam is regulated by the disk-valve H, it is evident the pressure against the end of this rod will be variable conformably with the regulation by the valve H. When the engine has a light load, requiring the least pressure of steam, the pressure on the rod will be least, and when the engine is heavily loaded, requiring a full pressure of steam, the pressure on the rod will be greatest, so that the force tending to move the disk H and open the steam-passage to the cylinders will be least with a light load and greatest with a full load.

As this force is counteracted by the revolutions of the bar K, it is evident that, with the same number of revolutions to this bar, the steam-passages will be more nearly closed with a light load, when the resistance to closing is least, than they will be with a heavy load, when the resistance to closing is greatest.

By increasing or diminishing the diameter of the connecting-rod g g the tension of the steam will have more or less effect upon it, so that the proportion which the steam and the spring shall have in controlling the position of the bar K may be determined at will. When this is properly adjusted the revolutions of the engine will be uniform with any load within its capacity.

In some cases it may be more convenient to use a weight to act in conjunction with the steam-pressure upon the bar K; or a lever and weight may be employed, whereby the amount of weight applied may be graduated. The tension of the spring may also be adjusted by a screw-plug in the end of the slide L; and I contemplate the use of such arrangements, with either the weight or spring, so as the more readily to adjust the governor to the revolutions required.

From the foregoing it has been shown that three forces are constantly acting upon my improved governor, two of which act in conjunction against the other one—to wit, the spring and the steam-pressure against the centrifugal force of the vibrating bar K. Of these three forces one is adjustable, and two vary automatically—that is to say, the tension of the spring may be adjusted at will. One is influenced by a variation in the velocity of the engine, which will affect the velocity of the governor-bar, and, consequently, its centrifugal force; and one is dependent upon the tension of the steam between the regulating valve or disk H and the cylinder, or (which is the same thing) in the cylinder itself, so long as the steam-port leading from the slide-valve to the cylinder is uncovered; so that, if the speed of the piston is diminished by an increase of load the tension of the steam between the regulating-valve and the cylinder would be increased, and the bar K would not only assume a more inclined position, from the decrease of speed, but this movement would be augmented by the increase of tension itself. So, likewise, a decrease of load would, of itself, produce a movement of the bar K in the opposite direction.

As before stated, when the spring and connecting-rod are properly proportioned the variations of pressure in the cylinders required by a varying load will be provided for, by a change in the position of the bar K, without a permanent change of its velocity, this change being produced by the very variations themselves, so that the load becomes the regulator of the tension of steam required to drive it, in place of the velocity of the governor, as heretofore.

It will thus be seen that the movement of the plane of the governor balls or weights is effected by a force which varies with the tension of the steam in the cylinder of the engine, and this must be proportionate to its load. The means by which this is accomplished may be greatly varied, so that I do not limit my invention to the particular devices described; but

What I claim as new, and desire to secure by Letters Patent, is—

The combination of the centrifugal device, the valve-rod, operating the regulating-valve, located in the distributing-valve, and exposed to the pressure of steam in the passage leading to the cylinder, and the interposed spring, the steam and the spring acting in the same direction, in opposition to the centrifugal device, substantially as and for the purpose set forth.

In testimony whereof I have hereunto subscribed my name.

PETER BROTHERHOOD.

Witnesses:
GEORGE MESSENGER,
GEORGE H. FERRY.